(12) United States Patent  
Nakamura (10) Patent No.: US 9,059,629 B2  
(45) Date of Patent: Jun. 16, 2015

(54) POWER SUPPLY DEVICE SYSTEM, SWITCHING POWER SUPPLY DEVICE, CONTROL PARAMETER GENERATION DEVICE, AND PROGRAM

(71) Applicant: MINEBEA CO., LTD., Kitasaku-gun, Nagano (JP)

(72) Inventor: Yoshihiro Nakamura, Fukuroi (JP)

(73) Assignee: MINEBEA CO., LTD., Kitasaku-gun (JP)

( * ) Notice: Subject to any disclaimer, the term of this patent is extended or adjusted under 35 U.S.C. 154(b) by 224 days.

(21) Appl. No.: 13/708,065

(22) Filed: Dec. 7, 2012

(65) Prior Publication Data

US 2013/0163299 A1 Jun. 27, 2013

(30) Foreign Application Priority Data

Dec. 22, 2011 (JP) ................. 2011-281799

(51) Int. Cl.  
*H02M 5/42* (2006.01)  
*H02M 7/04* (2006.01)  
*H02M 7/217* (2006.01)

(52) U.S. Cl.  
CPC ............... *H02M 7/04* (2013.01); *H02M 7/217* (2013.01)

(58) Field of Classification Search  
USPC ........................................ 363/78, 81, 84, 89  
See application file for complete search history.

(56) References Cited

U.S. PATENT DOCUMENTS

| 7,355,362 | B2 * | 4/2008 | Pai et al. ............... 318/432 |
| 2008/0031026 | A1 * | 2/2008 | Menas et al. ............ 363/78 |
| 2008/0212344 | A1 * | 9/2008 | Furem ..................... 363/46 |
| 2010/0091531 | A1 * | 4/2010 | Lum ........................ 363/84 |
| 2011/0080112 | A1 * | 4/2011 | Shearer et al. .......... 315/291 |

FOREIGN PATENT DOCUMENTS

JP     A-2005-116738     4/2005  
WO    WO 2009/133723 A1    11/2009

* cited by examiner

*Primary Examiner* — Adolf Berhane  
*Assistant Examiner* — Alex Torres-Rivera  
(74) *Attorney, Agent, or Firm* — Oliff PLC (57) ABSTRACT

A power supply device system including: a switching power supply device converting an alternating voltage to a predetermined direct current by means of a switching operation of a switching element, and supplying the direct current to a load; a control parameter generation device generating a control parameter corresponding to at least one of the alternating voltage and the direct current; and a signal transmission unit disposed between the switching power supply device and the control parameter generation device, transmitting the control parameter to the switching power supply device, wherein the switching power supply device has a control unit detecting the direct current, storing the control parameter, and generating a driving pulse for the switching element to perform the switching operation so that the direct current becomes substantially constant, based on the direct current detected and the control parameter stored.

7 Claims, 7 Drawing Sheets

| user | | host system 5 and control unit 12 |
|---|---|---|
| load specification (load current value) | | settings of constant current control parameters in accordance with setting items |
| setting items (selectable) | I1 (0.35A) | · target current value |
| | I2 | · gain of control circuit |
| | I3 | ⋮ |
| | ⋮ | |
| | In-1 | |
| | In (2.00A) | |

Fig. 4b

| user | | host system 5 and control unit 12 |
|---|---|---|
| source specification (alternating source voltage value) | | settings of constant current control parameters in accordance with setting items |
| setting items (selectable) | V1 (100V) | · target current value |
| | V2 (110V) | · target voltage value |
| | V3 (120V) | · reference voltage value |
| | ⋮ | · gain of control circuit |
| | Vn-1 (250V) | ⋮ |
| | Vn (277V) | |

Fig. 4c

| user | | host system 5 and control unit 12 |
|---|---|---|
| protection specification | | settings of protection function control parameters in accordance with setting items |
| setting items | · source overvoltage protection<br>· load overvoltage protection<br>· load overcurrent protection<br>· load open protection<br>· load short protection<br>· short interruption compensation<br>⋮ | · threshold value<br>· maximum permissible value<br>· minimum permissible value<br>· time constant (wait time)<br>⋮ |

POWER SUPPLY DEVICE SYSTEM, SWITCHING POWER SUPPLY DEVICE, CONTROL PARAMETER GENERATION DEVICE, AND PROGRAM

TECHNICAL FIELD

The present invention relates to a power supply device system, a switching power supply device, a control parameter generation device for the switching power supply device, and a program of the control parameter generation device.

BACKGROUND ART

For example, Japanese Unexamined Patent Application Publication No. 2005-116738 (Patent Literature 1) discloses a technology as a power supply device that converts an alternating power voltage with high efficiency, so as to acquire a direct current used to feed an LED (Light Emitting Diode) load, which is driven by a constant current.

According to the technology disclosed by Japanese Unexamined Patent Application Publication No. 2005-116738 (Patent Literature 1), a control signal used in an LED current control circuit is monitored, and, if it is detected that a forward voltage drop across the LED is low, i.e., the LED is efficient and a voltage drop across an FET (Field Effect Transistor) is high, a supply voltage for the overall LED current control circuit is decreased to reduce a wasted power consumed by the FET, thereby realizing a power saving. However, there is a drawback such that costs of design and manufacture will increase caused by increase in the number of features and types of LED load or increase in the number of specifications and types of lighting device equipped with LED load and power supply thereof.

On the other hand, for example, a pamphlet of WO2009/133723 (Patent Literature 2) discloses a technology as a switching power supply device that can change a feature and a specification thereof, independent upon a change in hardware design such as circuit configuration and circuit element constants, and control parameter generation device that generates a control program of the switching power supply.

According to the technology disclosed by the pamphlet of WO2009/133723 (Patent Literature 2), it is easy to change a design in accordance with changes in source voltage, load, and the like, and it is possible to change specifications without need for changes in circuit elements. Especially, an assembly manufacturer can easily reflect a user's proprietary specification on a circuit, and a device manufacturer only has to produce the selfsame power supply devices, thereby enabling to reduce the costs of design and manufacture.

SUMMARY OF INVENTION

Technical Problem

Meanwhile, according to the technology disclosed by the pamphlet of WO2009/133723 (Patent Document 2), it is presumed that an external device transmits a characteristic parameter and a control program of the switching power supply device by a physical contact between a writer and a data acquisition unit of the switching power supply device. However, since the pamphlet of WO2009/133723 (Patent Document 2) provides no specific description of the characteristic parameter and control program, the technology of the pamphlet of WO2009/133723 (Patent Document 2) is insufficient to solve the above described problems.

The present invention has been made in view of above described problems, and it is an object of the present invention to provide a power supply device system, a switching power supply device, a control parameter generation device for the switching power supply device, and a program of the control parameter generation device, which can change a feature and a specification at a low cost, without changing hardware design such as circuit configuration and circuit element constants.

Solution to Problem

A power supply device system according to a first aspect of the present invention is provided with a switching power supply device converting an alternating voltage supplied from an alternating power source to a predetermined direct current by means of a switching operation of a switching element, and supplying the direct current to a load; a control parameter generation device generating a control parameter corresponding to at least one of the alternating voltage and the direct current supplied to the load; and a signal transmission unit disposed between the switching power supply device and the control parameter generation device, transmitting the control parameter generated by the control parameter generation device to the switching power supply device, wherein the switching power supply device has a control unit detecting the direct current, storing the control parameter, and generating a driving pulse for the switching element to perform the switching operation so that the direct current becomes substantially constant, based on the direct current detected and the control parameter stored.

According to the first aspect of the present invention, the control unit may comprise: a feedback circuit determining and outputting a feedback amount in accordance with at least the detected result of the direct current; a storage circuit storing at least the control parameter; and a control circuit generating and outputting the driving pulse based on at least the feedback amount and the control parameter, wherein the control unit performs a control of determining a signal transmission path between the control parameter generation device and the switching power supply device via the signal transmission unit, based on a control instruction outputted from the control parameter generation device, and causes the storage circuit to store the control parameter transmitted from the control parameter generation device.

According to the first aspect of the present invention, the control circuit may further determine the signal transmission path based on the control instruction from the control parameter generation device, and cause the storage circuit to store the control parameter transmitted from the control parameter generation device.

According to the first aspect of the present invention, the control parameter generation device may comprise: an input unit selectively inputting information for specification setting, from which the control parameter is generated, based on at least visualized information for selection operation; and a processing unit carrying out a setting sequence of setting the control parameter to the switching power supply device based on the information for specification setting.

According to the first aspect of the present invention, the visualized information for selection operation may be displayed on a screen and selected by a user selection operation.

According to the first aspect of the present invention, the control parameter may include at least one of a load specification parameter based on the direct current and a source specification parameter based on the alternating voltage.

According to the first aspect of the present invention, the processing unit may carry out, based on the information for specification setting, a setting sequence at least including: signal path setting processing of determining the signal transmission path; specification setting processing of setting the control parameter to the control unit of the switching power supply device; and specification verification processing of verifying the control parameter thus set.

A switching power supply device according to a second aspect of the present invention is connected via a signal transmission unit to a control parameter generation device generating a control parameter corresponding to at least one of direct current supplied to a load and an alternating voltage supplied from the alternating power source, converting the alternating voltage to a predetermined direct current by means of switching operation of a switching element, and supplying the direct current to the load, the switching power supply device comprising a control unit detecting the direct current, storing the control parameter generated by the control parameter generation device, and generating a driving pulse for the switching element to perform the switching operation so that the direct current becomes substantially constant, based on the direct current detected and the control parameter stored.

A control parameter generation device according to a third aspect of the present invention is connected via a signal transmission unit to a switching power supply device converting alternating voltage supplied from an alternating power source to a predetermined direct current by means of switching operation of a switching element, and supplying the direct current to a load, for generating a control parameter corresponding to at least one of the direct current supplied to the load and the alternating voltage, the control parameter generation device comprising: an input unit selectively inputting information for specification setting, from which the control parameter is generated, including at least one of a load specification based on the direct current and a source specification based on the alternating voltage, based on at least visualized information for selection operation; and a processing unit, prior to setting the information for specification setting as the control parameter of the switching power supply device, carrying out a setting sequence including signal path setting processing of determining a signal transmission path via the signal transmission unit to the switching power supply device, a specification setting processing of setting the control parameter to the switching power supply device, and a specification verification processing of verifying the control parameter thus set.

A program according to a fourth aspect of the present invention, executable by a computer for a control parameter generation device, connected via a signal transmission unit to a switching power supply device for converting alternating voltage supplied from an alternating power source to a predetermined direct current by means of switching operation of a switching element, for generating a control parameter corresponding to at least one of direct current supplied to a load and alternating voltage, the program causing the computer to carry out: input processing of selectively inputting information for specification setting, from which the control parameter is generated, including at least one of a load specification based on the direct current and a source specification based on the alternating voltage, based on information for selection operation displayed on a screen; and setting sequence execution processing of determining a signal transmission path with the switching power supply device via the signal transmission unit, setting the information for specification setting as the control parameter to the switching power supply device, and verifying the control parameter thus set, based on the information for specification setting.

Advantageous Effects of Invention

According to the present invention, it is possible to provide a power supply device system, a switching power supply device, a control parameter generation device for the switching power supply device, and a program of the control parameter generation device, which can change a feature and a specification at a low cost, without changing hardware design such as circuit configuration and circuit element constants.

BRIEF DESCRIPTION OF DRAWINGS

FIGS. 4a, 4b, and 4c are diagrams in table format showing relationships between user operation and settings of control parameters in the control parameter generation device according to the embodiment of the present invention.

DESCRIPTION OF EMBODIMENTS

In the following, a detailed description will be given of an embodiment of the present invention with reference to drawings.

Configuration of Embodiment

Figure 1:
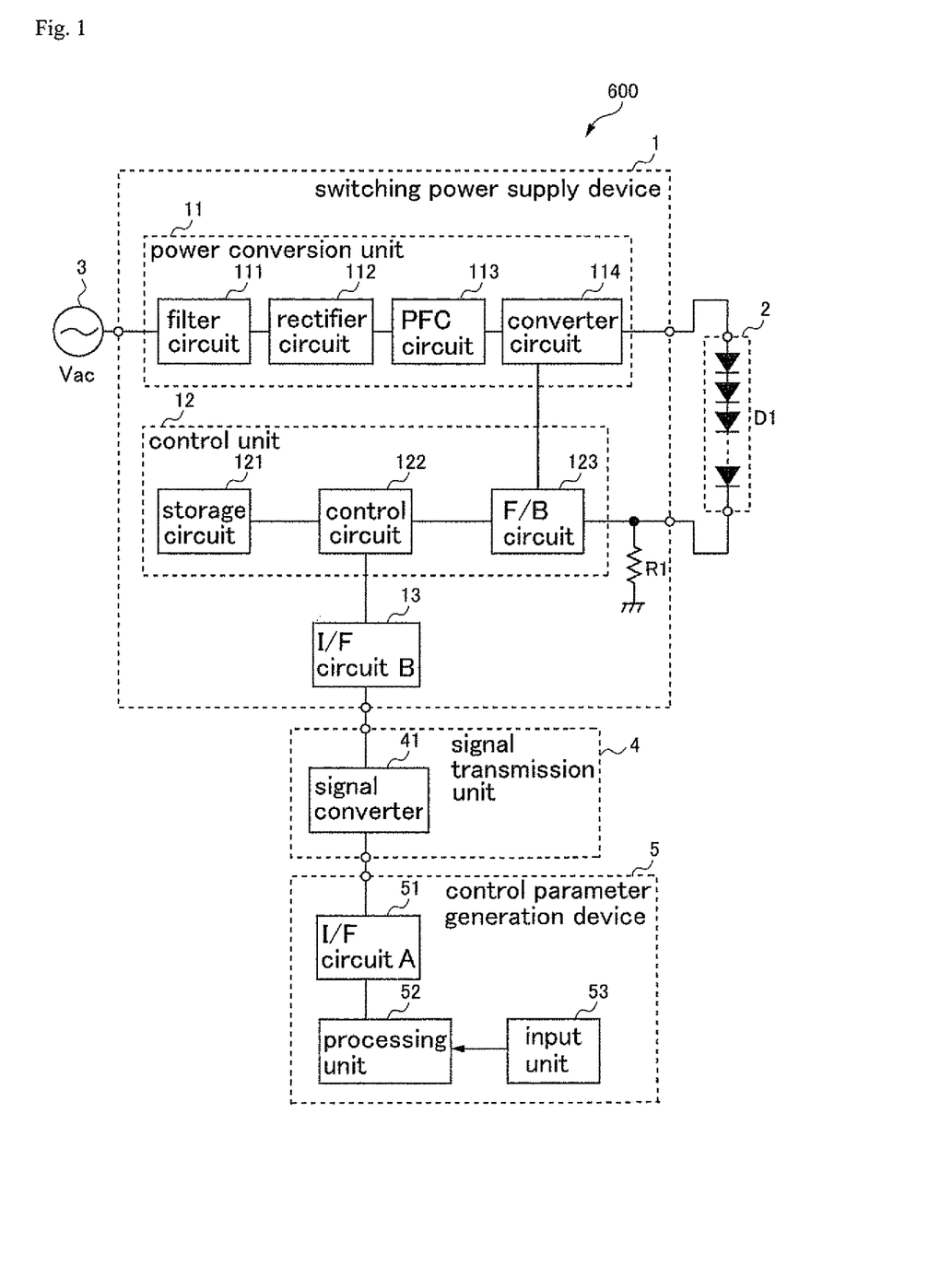
FIG. 1 is a block diagram showing a configuration of a power supply device system according to an embodiment of the present invention.

FIG. 1 is a block diagram showing a configuration of a power supply device system 600 according to the present embodiment of the present invention. As shown in FIG. 1, the power supply device system 600 according to the present embodiment is provided with a switching power supply device 1, a signal transmission unit 4, and a control parameter generation device 5 (hereinafter, also referred to as a "host system 5") that is employed as a generation device that generates control parameters.

The switching power supply device 1, to which a power (alternating voltage Vac) is supplied from an alternating power source 3, converts the alternating voltage to a predetermined direct current by means of a switching operation of an incorporated switching element (converter circuit), and supplies the direct current as a constant current to a constant current load 2 such as an LED. Furthermore, the switching power supply device 1 detects the direct current supplied to the constant current load 2, stores the control parameters generated by the host system 5, and generates a driving pulse for the incorporated switching element to perform the switching operation so that the direct current supplied to the constant current load 2 becomes substantially constant based on the detected direct current and the stored control parameters.

For this purpose, the switching power supply device 1 is provided with a power conversion unit 11, a control unit 12, and an interface circuit B (13). The power conversion unit 11, serving as a switching regulator that acquires the alternating voltage from the alternating power source 3 and converts the alternating voltage to the direct current of a sufficient value to drive the constant current load 2, is provided with a filter circuit 111, a rectifier circuit 112, a PFC (Power Factor Correction) circuit 113, and the converter circuit 114 that incorporates the switching element. In addition, a register R1 connected to the constant current load 2 and the feedback circuit 123 is a current sensor element for the feedback circuit 123 to detect a current flowing in the constant current load 2.

The control unit 12 detects the direct current supplied to the constant current load 2, stores the control parameters generated by the host system 5, and generates, based on the detected direct current and the stored control parameters, the driving pulse for the switching element to perform the switching operation so that the direct current supplied to the constant current load 2 becomes substantially constant. For this purpose, the control unit 12 is configured by an integrated arithmetic circuit including a feedback (F/B) circuit 123, a storage circuit 121, and a control circuit 122. The feedback (F/B) circuit 123 determines and outputs a feedback amount in accordance with a detected result of the direct current supplied to the constant current load 2. The storage circuit 121 stores the control parameters. The control circuit 122 outputs to the power conversion unit 11 the driving pulse for the switching element to perform the switching operation so that the direct current supplied to the constant current load 2 becomes constant current. The driving pulse is generated based on the feedback amount determined by the feedback circuit 123 and the control parameters stored in the storage circuit 121. The control circuit 122 may be configured by a microcontroller.

The control circuit 122 determines a signal transmission path via the signal transmission unit 4 to the host system 5 based on a control instruction (read/write command) outputted from the host system 5, and controls the storage circuit 121 to store the control parameters transmitted from the host system 5 corresponding to at least one of the direct current supplied to the constant current load 2 and the alternating voltage supplied from the alternating power source 3. Furthermore, the control circuit 122 generates, based on the feedback amount determined by the feedback circuit 123 and the control parameters stored in the storage circuit 121, the driving pulse for the switching element included in the converter circuit 114 to perform the switching operation so that the direct current supplied to the constant current load 2 becomes substantially constant.

The interface (I/F) circuit B (13) is adapted to perform data transmission between the switching power supply device 1 and the signal transmission unit 4 based on, for example, an RS-232C (Recommended Standard 232 version C) interface. The data transmission may be performed via a network such as LAN (Local Area Network) and the Internet, and may be via a wireless communication such as WiFi (registered trademark) and ZigBee (registered trademark).

In the switching power supply device 1 according to the present embodiment, it has been described that the control unit 12 is configured by the arithmetic circuit in which the storage circuit 121, the control circuit 122, and the feedback circuit 123 are integrated. However, all or a part of the constituent elements may be configured by respectively separated circuits or parts.

Furthermore, in the switching power supply device 1 shown in FIG. 1, it has been described that the driving pulse, which is generated by the control circuit 122 for the switching element included in the converter circuit 114 to perform the switching operation, is supplied to the converter circuit 114 from the control circuit 122 via the feedback circuit 123. However, the driving pulse may be supplied via a different path.

The signal transmission unit 4, intervening between the switching power supply device 1 and the host system 5, is adapted to perform communication for setting to the switching power supply device 1 the control parameters generated by the host system 5. For this purpose, a signal converter 41 that performs format conversion is incorporated in the signal transmission unit 4. Here, it is assumed that the communication is a wire transmission by way of RS-232C interface. However, the communication may be a wireless transmission, in which case, it is possible to employ a circuit configuration without the signal converter 41 by configuring so that the interface circuit B (13) included in the switching power supply device 1 and an interface circuit A (51), which will be described later, included in the host system 5 are provided with a function of wire/wireless conversion.

Although, in the power supply device system 600 according to the present embodiment, it has been described that the signal transmission unit 4 is requisite, a transmission system such as PLC (Power Line Communication), in which the signal transmission unit 4 is not explicitly required, may be employed.

The host system 5 is the control parameter generation device, configured by, for example, a PC (Personal Computer), that generates the control parameters corresponding to at least one of the direct current supplied to the constant current load 2 and the alternating voltage supplied from the alternating power source 3. Here, the control parameters include at least one of load specification parameters based on the direct current supplied to the constant current load 2 and source specification parameters based on the alternating voltage supplied from the alternating power source 3. For this purpose, the host system 5 is configured so as to include the interface circuit A (51), a processing unit 52, and an input unit 53.

The interface circuit A (51) is adapted to perform the data transmission with the signal transmission unit 4 based on, for example, RS-232C interface. The input unit 53, having a function of user interface, is adapted to acquire and output to the processing unit 52 information for specification setting including at least one of load specification based on the direct current supplied to the constant current load 2 and source specification based on the alternating voltage supplied from the alternating power source 3, which are inputted, for example, based on information for selection operation displayed on a screen. The processing unit 52 is adapted to execute an application program that carries out a setting sequence including processing of determining a signal transmission path with the switching power supply device 1 via the signal transmission unit 4 prior to setting the information for specification setting outputted from the input unit 53 as the control parameters for the switching power supply device 1, processing of setting the control parameters to the switching power supply device 1, and processing of verifying control parameter setting.

Although the control parameter generation device (host system 5) according to the present embodiment is configured by the PC that executes the application program having all the above described functions, every or some of the constituent elements such as the input unit 53 and the processing unit 52 may be configured separately. Furthermore, the PC is not requisite, but, for example, a device designed to set the control parameters including the signal transmission unit 4 may be employed as the host system 5.

Figure 2:
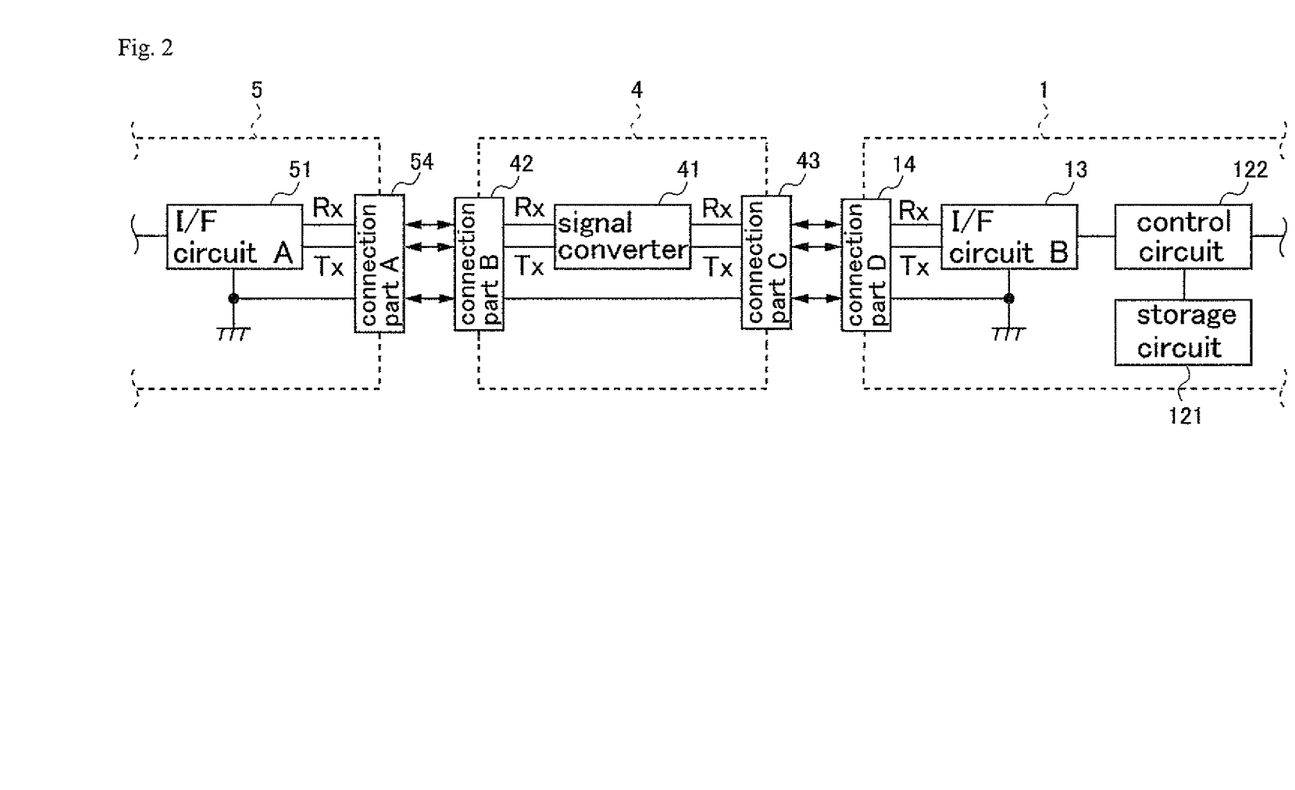
FIG. 2 is a block diagram showing a configuration of a principal part in data communication of the power supply device system according to the embodiment of the present invention.

FIG. 2 is a block diagram showing a configuration of a principal part in data communication of the power supply device system 600 shown in FIG. 1. In FIGS. 1 and 2, the same blocks are shown with the same reference numerals. In FIG. 2, the host system 5 is connected via a connection part A (54) thereof to a connection part B (42) of the signal transmission unit 4. Here, the connection parts A (54) and B (42) are connectors such as a D sub-9 pin connector, a USB (Universal Serial Bus) connector and the like. On the other hand, the switching power supply device 1 is connected via a connection part D (14) thereof to a connection part C (43) of the signal transmission unit 4. Here, the connection part D (14) is a dedicated terminal B, and the connection part C (43) is a dedicated terminal A. In FIG. 2, Tx denotes a transmitting line, and Rx denotes a receiving line. The transmitting line Tx and the receiving line Rx of the interface circuit A (51) are respectively coupled with the receiving line Rx and the transmitting line Tx of the signal converter 41 via the connection part A (54) and the connection part B (42). The transmitting line Tx and the receiving line Rx of the signal converter 41 are respectively coupled with the receiving line Rx and the transmitting line Tx of the interface circuit B (13) via the connection part C (43) and the connection part D (14).

The connection parts A (54), B (42), C (43), and D (14) are not limited to the above described types of connector. Especially, if the switching power supply device 1 is covered with a housing (not shown), the connection part D (14) may be mounted in an opening part provided to the housing. Also, the connection part D (14) may be disposed on a printed circuit board along with the control circuit 122, which constitutes the switching power supply device 1. Furthermore, the host system 5 may be configured to directly connect to the control circuit 122 of the switching power supply device 1 in a format outputted from the signal converter 41 of the signal transmission unit 4, without using the interface circuit A (51).

Figure 3:
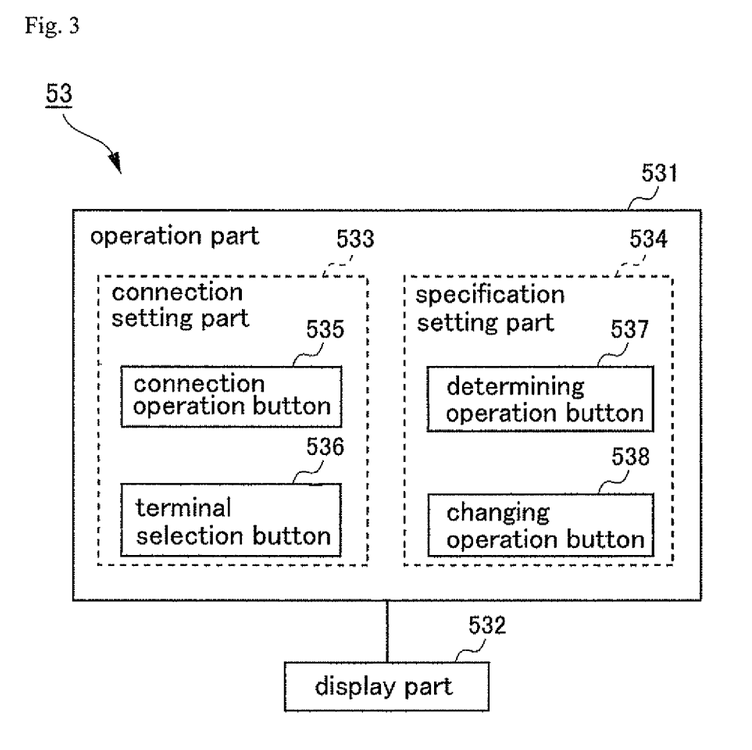
FIG. 3 is a diagram showing a user interface of a control parameter generation device according to the embodiment of the present invention.

FIG. 3 is a pattern diagram of the input unit 53 showing the user interface provided by the control parameter generation device (host system 5) according to the present embodiment. As shown in FIG. 3, the input unit 53 has an operation part 531 and a display part 532. Since the control parameter generation device (host system 5) is configured by the PC, as described above, the operation part 531 is configured by an operation screen of a display device connected to the PC and an input device such as a keyboard and a mouse connected to the PC. The operation screen may be configured to be partitioned into a connection setting part 533 and a specification setting part 534. A connecting operation button 535 and a terminal selection button 536 are allocated and displayed on the connection setting part 533. A determining operation button 537 and a changing operation button 538 are allocated and displayed on the specification setting part 534. Functions of these buttons will be described later.

The display part 532 is not limited in form and performance as a display device as long as the host system 5 and the switching power supply device 1 are in a state of being connected with each other via the signal transmission unit 4 to ensure the data communication therebetween, and the display part 532 can display a content for a user to confirm the information for specification setting inputted by the user operation of the operation part 531. Therefore, in place of the display device connected to the PC, for example, an indicator that turns on, turns off, blinks, emits colors, and the like may be employed as the display part 532. In this case, the constituent buttons of the operation part 531 may be operably attached to a device adapted to set the control parameters.

Figure 4A:
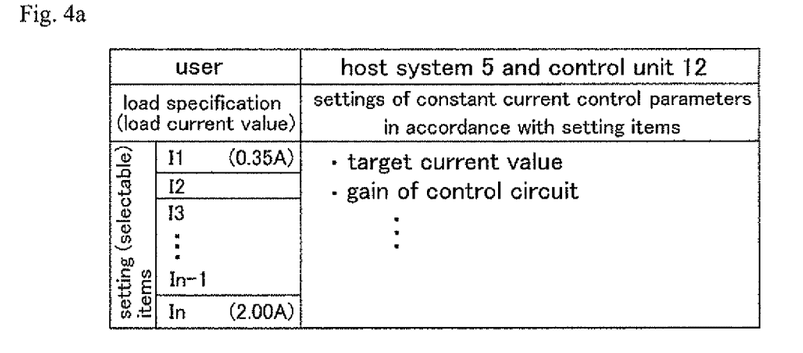
FIG. 4a shows settings of the load specification (load current value)
Figure 4B:
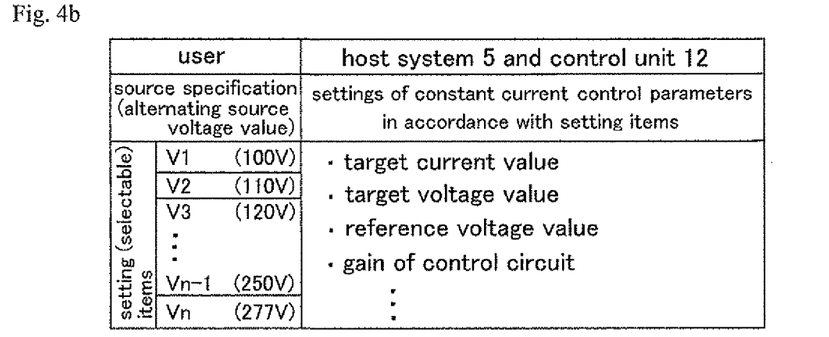
FIG. 4b shows settings of the source specification (alternating source voltage value)
Figure 4C:
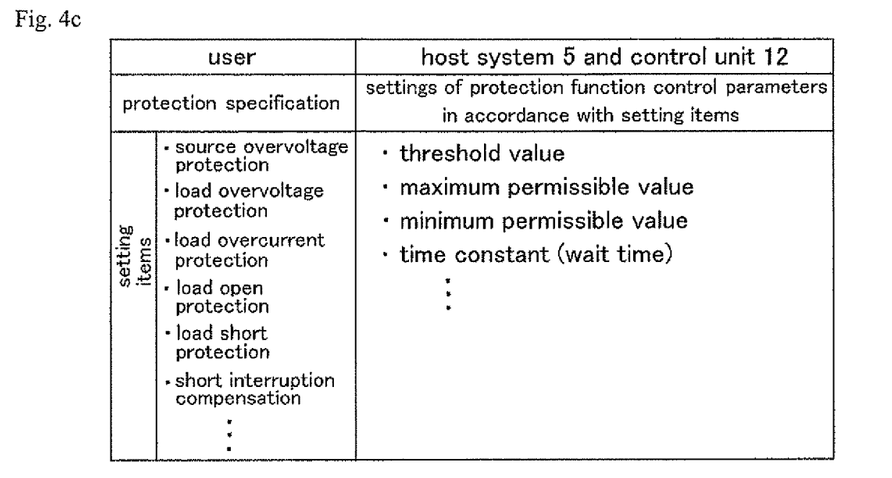
FIG. 4c shows settings of protection specification parameter.

In FIGS. 4*a-c*, relationships between user operation and settings of the control parameters to the switching power supply device 1 are shown in table format. Here, settings of the load specification (load current value) are shown in FIG. 4*a*, settings of the source specification (alternating source voltage value) are shown in FIG. 4*b*, and settings of protection specification parameter are shown in FIG. 4*c*.

Figure 6:
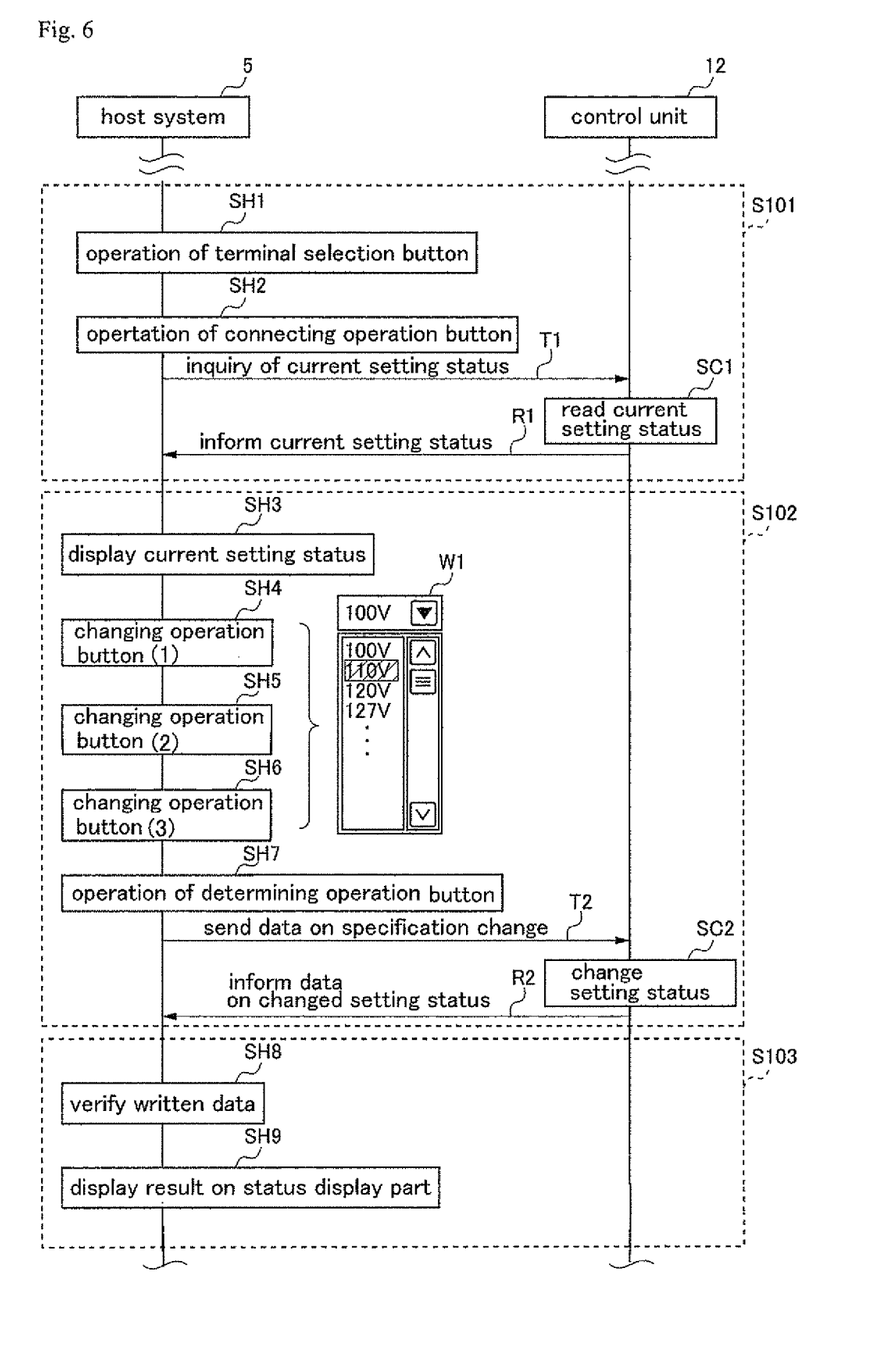
FIG. 6 is a diagram showing an operating sequence of the power supply device system according to the embodiment of the present invention.

As shown in FIG. 4*a*, setting items with regard to the load specification (load current value) are displayed on the operation screen of the operation part 531 in, for example, pull down format (see W1 of FIG. 6). When a user operates to select a setting item from the list of setting items, the host system 5 acquires a content of the setting item, generates, in accordance with the setting item, constant current control parameters including a target current value and a gain of the control circuit 122, and sets the constant current control parameters to the control unit 12 of the switching power supply device 1. Instead of the above described method, a method of directly entering the load current value as the load specification may be employed as the method of setting. In FIG. 4*a*, settable ranges and types (numbers) of the setting items with regard to the load specification (load current value) depend on design specification.

In FIG. 4*a*, the setting items with regard to the load specification (load current value) may be the numbers, connection modes, or combination thereof of LEDs or the like, which constitute the constant current load 2 and determine the load current value. In this case, they are convenient for a user who configures the load specification in accordance with wiring specification for an electronic device or facility, to which the constant current load 2 is mounted.

According to FIG. 4*b*, the setting items with regard to the source specification (alternating source voltage value) are displayed on the operation screen of the operation part 531 in, for example, pull down format (see W1 of FIG. 6). When a user operates to select a setting item from the list of the setting items, the host system 5 acquires a content of the setting item, generates, in accordance with the setting item, the constant current control parameters including the target current value, a target voltage value, a reference voltage value, and the gain of the control circuit 122, and sets the constant current control parameters to the control unit 12 of the switching power supply device 1. A method of directly entering the alternating source voltage value as the source specification may also be employed as the method of setting. In FIG. 4*b*, settable ranges and types (numbers) of the setting items with regard to the source specification (alternating source voltage value) depend on design specification. As a voltage value of domestic electricity, 100 V, 110 V, 120 V, 127 V, 200 V, 220 V, 230 V, 240 V, 250 V, 277 V, and the like are known to be used. A detailed description thereof is disclosed at URL1 or the like.
(URL1) http://users.telenet.be/worldstandards/electricity.htm In FIG. 4*b*, it may be convenient to the user to, in advance, prepare lists of voltage values specific to respective uses such as domestic use and business use and to provide a user interface, which allows the user to select at least one of the lists of voltage values specific to the user's desired use. Also, it is possible to prepare lists of voltage values specific to regions of the world such as Asia, North America, and Europe, and to provide a user interface, which allows the user to select at least one of the lists of voltage values specific to the user's desired region. In this case, as setting items, in place of the voltage values, more readily understandable item names such as country names or the like may be employed so as to further increase convenience and reliability of operation.

According to FIG. 4c, setting items with regard to protection specification such as input overvoltage protection, output overvoltage protection, and output overcurrent protection are displayed on the operation screen of the operation part 531 in, for example, pull down format (see W1 of FIG. 6). When a user operates to select a setting item from the list of setting items, the host system 5 acquires a content of the setting item, generates, in accordance with the setting item, protection function control parameters including a threshold, minimum and maximum permissible values, a time constant (wait time), and the like, and sets the protection function control parameters to the control unit 12 of the switching power supply device 1. In FIG. 4c, contents of the setting items depend on design specification. Also, if the setting items of the load specification and the source specification are set to be interlocked with the setting items of the load specification and the source specification, the protection specification can be specified automatically, which will reduce the required amount of user operation.

It is to be noted that the control parameters shown in FIGS. 4a, 4b, and 4c are mere examples, and may include other parameters as well. Here, at least the target current value is required since the LED is exemplified as the constant current load 2.

Figure 5:
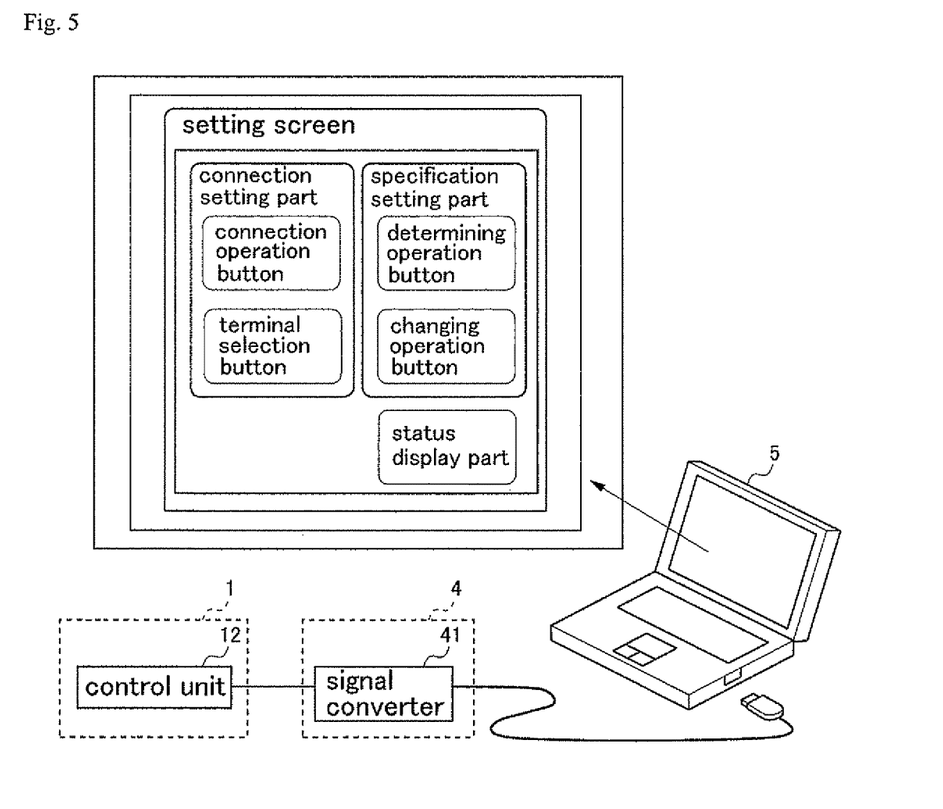
FIG. 5 is a diagram showing a state of execution of a setting sequence of the control parameters by the control parameter generation device according to the embodiment of the present invention.

FIG. 5 shows a state of execution of an application program (hereinafter, simply referred to as a "program") by the control parameter generation device (host system 5) according to the present embodiment. In FIGS. 1 and 5, the same blocks are shown with the same reference numerals. The program according to the present embodiment is provided with a function of displaying the operation screen for a double purpose of setting operation of the control parameters and displaying a status on the display device of the PC. The program may be configured to provide a user interface, allowing a user to set the control parameters by operating various buttons allocated and displayed on a connection setting part and a specification setting part by means of a keyboard and a pointing device, while confirming the information for specification setting displayed on a status display part shown in FIG. 5.

On the status display part, information such as on the control parameters and on a result (success or failure) of setting processing is displayed. The status display function of the status display part may be implemented by directly displaying the information on the connection setting part 533 and the specification setting part 534 shown in FIG. 3. Furthermore, it is possible to supply the control parameters via a network such as LAN and the Internet, or via a storage media such as CD-ROM and USB memory.

Although, the above described program according to the present embodiment is stored in and executed by the control parameter generation device (host system 5), the above described functions may be implemented in a manner such that the program is stored in the storage circuit 121 of the control unit 12 at the time of manufacturing the switching power supply device 1, and the control circuit 122 sequentially reads out and executes the program.

Operation of the Embodiment

FIG. 6 is an operating sequence diagram of the power supply device system 600 according to the present embodiment. FIG. 6 shows an operating sequence between the host system 5 and the switching power supply device 1. In the following, a detailed description will be given of an operation of the power supply device system 600 according to the present embodiment shown in FIGS. 1 to 5 with reference to the operating sequence diagram of FIG. 6.

First, it is assumed that a user has operated the terminal selection button 536 (SH1) and then the connecting operation button 535 (SH2) allocated and displayed on the connection setting part 533 of the operation screen by using the user interface provided by the host system 5. In response to the user operation, the input unit 53 acquires contents of the user operation and provides it to the processing unit 52. Upon receiving it, the processing unit 52 sends a control instruction (setting status read command) to the control unit 12 of the switching power supply device 1 via the signal transmission unit 4. By sending the setting status read command, the host system 5 inquires a current setting status of the switching power supply device 1 (T1).

In the switching power supply device 1 (control unit 12), upon receiving the setting status read command sent from the host system 5, the control circuit 122 retrieves data indicative of the current setting status of the switching power supply device 1 from the storage circuit 121 (SC1), and inform the host system 5 of the data via the signal transmission unit 4 (R1). Then, in the host system 5, the processing unit 52 generates display data based on the data indicative of the current setting status of the switching power supply device 1, and supplies the display data to the input unit 53. Upon receiving the display data, the input unit 53 displays the current setting status of the switching power supply device 1 on the display part 532 (SH3). Here, information on the control parameters is displayed based on the current setting status of the specification of the switching power supply device 1.

In the status indications on the display part 532, support information on connection and operation may be indicated such as an error message, guidance tips, information on a result of the setting processing, and model information such as a model number of the switching power supply device 1, if there are a plurality of types of the switching power supply device 1.

Upon confirming the current setting status of the switching power supply device 1 from the screen, the user operates the changing operation button 538 allocated and displayed on the specification setting part 534 of the operation screen of the operation part 531, then, a pull down menu shown with W1 is displayed in a pop up window on a part of the operation screen. Subsequently, using the pull down menu, the user performs a selective setting operation with regard to the source specification, the load specification, and the protection specification (SH4 to SH6). When the user operates the determining operation button 537, the input unit 53 acquires respective user settings (information for specification setting) with regard to the source specification, the load specification, and the protection specification, and supplies them to the processing unit 52.

Upon receiving the information for specification setting, the processing unit 52 issues a specification change write command for the switching power supply device 1, and sends it along with the information for specification setting to the control unit 12 of the switching power supply device 1 via the signal transmission unit 4 (ST2). When the control unit 12 receives the specification change write command and the information for specification setting, the control circuit 122 controls the storage circuit 121 to modify and update the setting status stored therein based on the information for specification setting (SC2).

Since then, in the switching power supply device 1, the feedback circuit 123 of the control unit 12 determines the feedback amount in accordance with the detected result of the direct current supplied to the constant current load 2, and outputs it to the control circuit 122. Upon receiving the feedback amount, based on the feedback amount and the updated control parameters stored in the storage circuit 121, the control circuit 122 generates the driving pulse for the switching element to perform the switching operation so that the direct current supplied to the constant current load 2 becomes constant, and outputs it to the converter circuit 114 of the power conversion unit 11 via the feedback circuit 123.

Then, the control unit 12 informs the host system 5 of the modified setting status (written data) via the signal transmission unit 4 (R2). Upon receiving it, the host system 5 verifies the written data (SH8), and displays the verification result (whether the setting is successful or not, and the setting status) on the display part 532, thereby a series of processing with regard to the setting operation to change specification is terminated (SH9).

In FIG. 6, steps S101 to S103 show the setting sequence carried out by the processing unit 52 of the host system 5. In the present embodiment, the setting sequence includes a connection setting step (S101), a specification setting step (S102), and a specification verification step (S103). This means that the processing unit 52 carries out, based on the acquired information for specification setting, signal path setting processing (S101) of determining a signal transmission path between the host system 5 and the control unit 12 of the switching power supply device 1 via the signal transmission unit 4, specification setting processing (S102) of setting the control parameters to the control unit 12 of the switching power supply device 1, and specification verification processing (S103) of verifying control parameter setting.

In FIG. 6, selection of connection terminal shown with SH1 is not requisite but is merely a function of line selection in a case in which the host system 5 has a plurality of output lines. Also, selection of the source specification shown with SH4 is unnecessary in a case in which the switching power supply device 1 has only one power source. Furthermore, the protection specification shown with SH6 may be set to be interlocked with the determination of the load specification and the source specification shown with SH7 so that selection of the protection specification shown with SH6 is specified automatically. In the above, as one example of method of selecting the connection terminal and setting various specifications, it has been described that a user selects setting items to be set by operating a pull down menu displayed on a partial area of the operation screen. However, a method may be employed such that a user directly enters values to be set. Furthermore, by issuing a write start command and a write end command, setting a wait time, or the like during the period between determination of the specification (SH7) and verification of the data (SH8), it is possible to more smoothly carry out the setting processing between the host system 5 and the control unit 12.

In a case in which wire data communication is employed, it is assumed that a physical connection between the host system 5 and the control unit 12 is completed prior to execution of the setting sequence shown in FIG. 6. Since the host system 5 does not directly control the switching power supply device 1, it is assumed that the host system 5 and the signal transmission unit 4 are physically disconnected from the switching power supply device 1 before the switching power supply device 1 starts to operate in connection with the alternating power source 3 and the constant current load 2.

Figure 7:
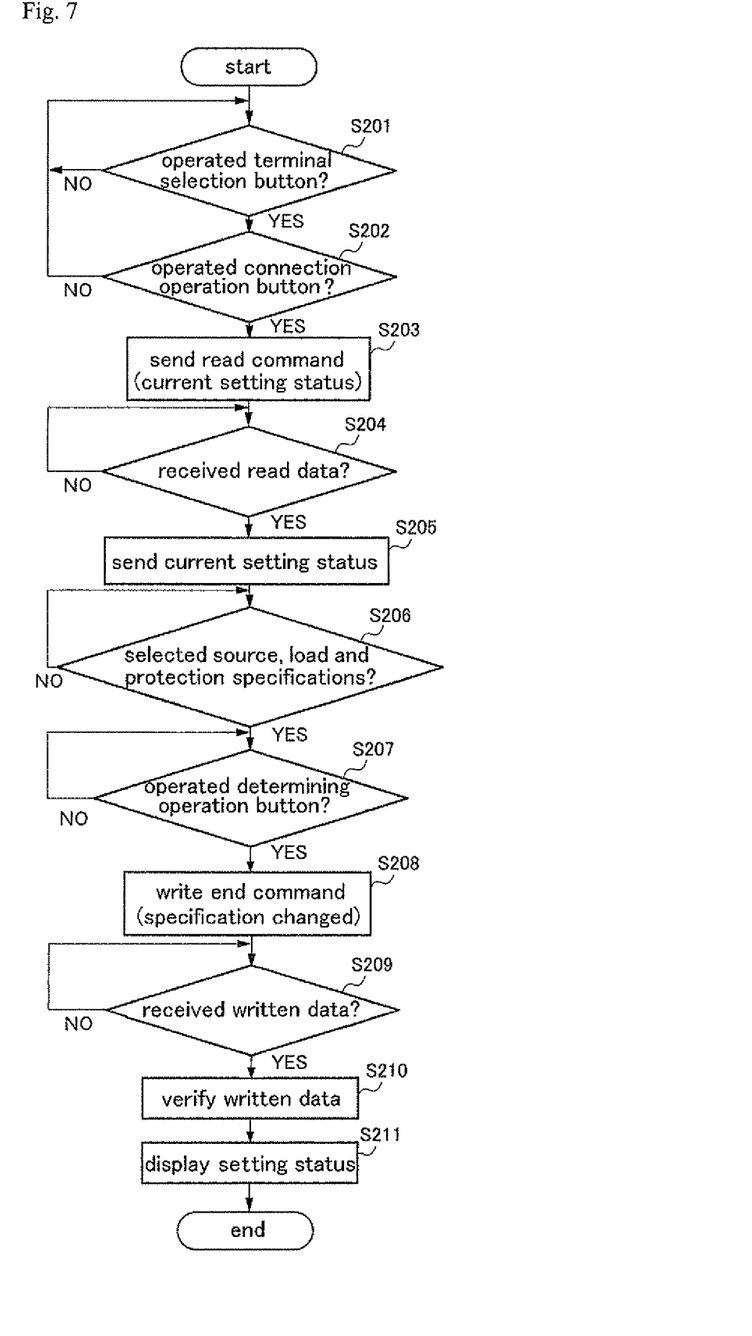
FIG. 7 is a flowchart showing an operation of the control parameter generation device according to the embodiment of the present invention.

FIG. 7 is a flowchart showing operation of the control parameter generation device according to the present embodiment. In the following, a detailed description will be given of the operation of the control parameter generation device (host system 5) according to the present embodiment with reference to the flowchart of FIG. 7.

First, a user operates the terminal selection button 536 (step S201: YES) on the operation screen of the user interface provided by the input unit 53, and then the connecting operation button 535 (step S202: YES). Upon receiving information on the above described user operation from the input unit 53, the processing unit 52 sends a read command to read the current setting status (setting status read command) to the control unit 12 of the switching power supply device 1 (step S203). Upon receiving read data indicative of the current setting status from the control unit 12 of the switching power supply device 1 in response to the read command (step S204: YES), the processing unit 52 generates and provides to the input unit 53 display data based on the read data indicative of the current setting status of the switching power supply device 1 (step S205).

Upon receiving the display data, the input unit 53 displays the current setting status of the switching power supply device 1 on the screen. Then, the input unit 53 monitors whether user operates to select any setting item of the load specification, the source specification, and the protection specification from the respective pull down menus (step S206). After the user selectively inputs setting items (selective setting input) for the information for specification setting (step S206: YES), upon detecting an operation of the determining operation button 537 (step S207: YES), the input unit 53 acquires and provides to the processing unit 52 the information for specification setting. The processing unit 52 sends to the switching power supply device 1 (control unit 12) the information for specification setting along with a write command (specification change write command) (step S208).

In the switching power supply device 1 (control unit 12), upon receiving the specification change write command, the control circuit 122 controls the storage circuit 121 to modify and update the setting status stored therein based on the information for specification setting. After that, the feedback circuit 123 determines and outputs to the control circuit 122 the feedback amount in accordance with the detected result of the direct current supplied to the constant current load 2. Upon receiving the feedback amount, based on the feedback amount and the control parameters stored in the storage circuit 121, the control circuit 122 generates the driving pulse for the switching element incorporated in the power conversion unit 11 (converter circuit 114) to perform the switching operation so that the direct current supplied to the constant current load 2 becomes substantially constant, and outputs the driving pulse to the converter circuit 114 via the feedback circuit 123.

Then, in the host system 5, upon receiving the written data indicative of the modified setting status from the control unit 12 in response to the above described write command (step S209: YES), the processing unit 52 verifies the written data (step S210), and displays the verification result (whether or not succeeded in setting, and the setting status) of the setting of the control parameters on the input unit 53 (step S211), thereby a series of operation of control parameter setting processing ends.

With regard to operations of the above described buttons, as well as the method of selecting the buttons displayed on the screen connected to the PC by way of a pointing device such as a mouse, a method such as directly pushing buttons displayed on the screen or operably arranged on a device for setting the control parameters may be employed.

Effect of Embodiment

As described above, according to the power supply device system 600 of the present embodiment, the switching power supply device 1 detects the direct current supplied to the constant current load 2, stores at least a control parameter generated by the host system 5, and generates, based on the detected direct current and the stored control parameter, the driving pulse for the switching element to perform the switching operation so that the direct current supplied to the constant current load 2 becomes substantially constant. As a result thereof, the switching power supply device 1 can control the incorporated switching element using the stored control parameter, thereby it is possible to provide the power supply device system 600 that can change a feature and a specification at a low cost and/or without changing hardware design such as circuit configuration and circuit element constants.

Furthermore, according to the switching power supply device 1 of the present embodiment, the control unit 12 detects the direct current supplied to the constant current load 2, stores at least a control parameter generated by the host system 5, and, based on the detected direct current and the stored control parameter, generates the driving pulse for the switching element incorporated in the power conversion unit 11 (converter circuit 114) to perform the switching operation so that the direct current supplied to the load becomes substantially constant. As a result thereof, the switching power supply device 1 can control the switching element using the stored control parameter, thereby it becomes possible to provide the switching power supply device 1 that can change a feature and a specification at a low cost and/or without changing hardware design such as circuit configuration and circuit element constants.

According to the control parameter generation device (host system 5) of the present embodiment, the processing unit 52 carries out the setting sequence including processing of determining the signal transmission path with the switching power supply device 1 via the signal transmission unit 4 before setting the information for specification setting acquired by the input unit 53 as the control parameter(s) to the switching power supply device 1, processing of setting the control parameter(s) to the switching power supply device 1, and processing of verifying control parameter setting. As a result thereof, the switching power supply device 1, in which the setting sequence has been carried out and the control parameter(s) is(are) set, can control the switching element incorporated in the power conversion unit 11 (converter circuit 114) using the verified control parameter(s), thereby it becomes possible to change a feature and a specification at a low cost and/or without changing hardware design such as circuit configuration and circuit element constants.

The program according to the present embodiment is, for example, as shown in FIG. 1, executed by the control parameter generation device (host system 5). The program is a program of the control parameter generation device 5 that is connected via the signal transmission unit 4 to the switching power supply device 1, which converts the alternating voltage supplied from the alternating power source 3 so as to acquire the predetermined direct current by means of the switching operation of the switching element and supplies the predetermined direct current to the load (constant current load 2), and generates the control parameter (s) corresponding to at least one of the direct current supplied to the load and the alternating voltage. For example, as shown in FIG. 7, the program causes the control parameter generation device 5 to carry out input processing (steps S201 to S207) of acquiring the information for specification setting including at least one of the load specification based on the direct current supplied to the load and the source specification based on the alternating voltage supplied from the alternating power source 3. Then, the program causes the control parameter generation device 5 to carry out setting sequence execution processing (steps S208 to S211), based on the acquired information for specification setting, of determining the signal transmission path with the switching power supply device 1 via the signal transmission unit 4, setting the acquired information for specification setting as the control parameter(s) to the switching power supply device 1, and verifying control parameter setting.

According to the program of the present embodiment, the control parameter generation device (host system 5) sequentially retrieves and executes the program to carry out the following processing. The program causes the control parameter generation device 5 to carry out processing of acquiring the information for specification setting, which is inputted to the PC based on the information for selection operation displayed on the display device or the like of the PC, including at least one of the load specification based on the direct current supplied to the constant current load 2 and the source specification based on the alternating voltage Vac supplied from the alternating power source 3. And then, the program causes the control parameter generation device 5 to carry out, based on the acquired information for specification setting, processing of determining the signal transmission path with the switching power supply device 1 via the signal transmission unit 4, setting the acquired information for specification setting as the control parameter(s) to the switching power supply device 1, and verifying the control parameter(s) setting. As a result thereof, the switching power supply device 1, in which the setting sequence has been carried out and the control parameter(s) is(are) set, can control the incorporated switching element using the verified control parameter(s), thereby it becomes possible to change a feature and a specification at a low cost and/or without changing hardware design such as circuit configuration and circuit element constants.

According to the power supply device system 600 of the present embodiment, it has been described that the switching power supply device 1 using constant current control is employed on the premise of using the constant current load 2 such as the LED. However, the same configuration and method may be applied to a switching power supply device using constant voltage control or constant power control.

Furthermore, according to the power supply device system 600 of the present embodiment, it has been described that the information for specification setting, from which the control parameter(s) is(are) generated, is selectively inputted based on the visualized information for selection operation. However, the above configuration may be accompanied by a configuration and method that generates audible information (sound information) for the purpose of aid for a user to operate and/or annunciation of execution status of the setting sequence.

Furthermore, the present invention does not exclude the possibility of including a function of respectively changing an output current, voltage, and power of the switching power supply devices using constant current control, constant voltage control, and constant power control. This means that, for example, in a case in which the switching power supply device using constant current control drives a lighting device having a constant current load such as LED or the like as a light source, the switching power supply device may include a dimming function of controlling an amount of luminescence of LED or the like by changing an output current.

It should be noted that the present invention is not limited to the scope described in the embodiment described above. It will be clear to those skilled in the art that modifications and improvements may be made to the embodiment described above. It should be noted that such modifications and improvements are included in the scope of the present invention, as is clear from the description of the claims.

REFERENCE LIST 1 switching power supply device
2 constant current load
3 alternating power source
4 signal transmission unit
5 control parameter generation device (host system)
11 power conversion unit
12 control unit
13 interface circuit B
41 signal converter
51 interface circuit A
52 processing unit
53 input unit
121 storage circuit
122 control circuit
123 feedback circuit (F/B circuit)
600 power supply device system

CITATION LIST

Patent Literature

Patent Literature 1: Japanese Unexamined Patent Application Publication No. 2005-116738
Patent Literature 2: Pamphlet of WO2009/133723

The invention claimed is:

1. A power supply device system comprising:
a switching power supply device comprising:
a power conversion unit converting an alternating voltage supplied from an alternating power source to a predetermined direct current by means of a switching operation of a switching element, and supplying a direct current to a load; and
a control unit controlling the switching power supply device;
a control parameter generation device comprising:
an input unit selectively inputting information for specification setting; and
a processing unit generating a control parameter to control the switching power supply device based on the information for specification setting; and
a signal transmission unit disposed between the switching power supply device and the control parameter generation device, transmitting the control parameter from the processing unit of the control parameter generation device to the control unit of the switching power supply device,
wherein the control unit comprises:
a feedback circuit detecting the direct current, and determining and outputting a feedback amount in accordance with at least the detected result of the direct current;
a storage circuit storing at least the control parameter; and
a control circuit generating and outputting a driving pulse for the switching element to perform the switching operation so that the direct current becomes substantially constant, based on at least the feedback amount of the direct current detected and the control parameter stored,
wherein the control circuit of the control unit performs a control of determining a signal transmission path between the control parameter generation device and the switching power supply device via the signal transmission unit, based on a control instruction outputted from the processing unit of the control parameter generation device, and causes the storage circuit of the control unit to store the control parameter transmitted from the processing unit of the control parameter generation device, and
wherein the control parameter includes at least one of a load specification parameter based on the direct current and a source specification parameter based on the alternating voltage, and further a protection specification parameter to protect the load.

2. The power supply device system according to claim 1, wherein the input unit selectively inputs the information for specification setting based on at least visualized information for selection operation; and the processing unit carries out a setting sequence of setting the control parameter based on the information for specification setting.

3. The power supply device system according to claim 2, wherein the visualized information for selection operation is displayed on a screen and selected by a user selection operation.

4. The power supply device system according to claim 2, wherein the processing unit carries out the setting sequence including:
signal path setting processing of determining the signal transmission path;
specification setting processing of setting the control parameter to the control unit of the switching power supply device; and
specification verification processing of verifying the control parameter thus set.

5. A switching power supply device, connected via a signal transmission unit to a control parameter generation device generating a control parameter to control the switching power supply device, the switching power supply device comprising:
a power conversion unit converting the alternating voltage to a predetermined direct current by means of a switching operation of a switching element, and supplying a direct current to a load; and
a control unit controlling the switching power supply device, the control unit comprising:
a feedback circuit detecting the direct current;
a storage circuit storing at least the control parameter; and
a control circuit generating and outputting a driving pulse for the switching element to perform the switching operation so that the direct current becomes substantially constant, based on at least the feedback amount of the direct current detected and the control parameter stored,
wherein the control circuit of the control unit performs a control of determining a signal transmission path between the control parameter generation device and the switching power supply device via the signal transmission unit, based on a control instruction outputted from a processing unit of the control parameter generation device, and causes the storage circuit of the control unit to store the control parameter transmitted from the processing unit of the control parameter generation device, and wherein the control parameter includes at least one of a load specification parameter based on the direct current and a source specification parameter based on the alternating voltage, and further a protection specification parameter to protect the load.

6. A control parameter generation device, connected via a signal transmission unit to a switching power supply device converting an alternating voltage supplied from an alternating power source to a predetermined direct current by means of a switching operation of a switching element, and supplying a direct current to a load, for generating a control parameter to control the switching power supply device, the control parameter generation device comprising:

an input unit selectively inputting information for specification setting, from which the control parameter is generated, including at least one of a load specification based on the direct current and a source specification based on the alternating voltage, based on at least visualized information for selection operation; and a processing unit, prior to setting the information for specification setting as the control parameter of the switching power supply device, carrying out a setting sequence including signal path setting processing of determining a signal transmission path via the signal transmission unit to the switching power supply device, a specification setting processing of setting the control parameter to the switching power supply device, and a specification verification processing of verifying the control parameter thus set;

wherein the control parameter includes at least one of a load specification parameter based on the direct current and a source specification parameter based on the alternating voltage, and further a protection specification parameter to protect the load.

7. A program executable by a computer for a control parameter generation device, connected via a signal transmission unit to a switching power supply device for converting an alternating voltage supplied from an alternating power source to a predetermined direct current by means of a switching operation of a switching element, for generating a control parameter to control the switching power supply device, the program causing the computer to:

input processing of selectively inputting information for specification setting, from which the control parameter is generated, including at least one of a load specification based on the direct current and a source specification based on the alternating voltage, based on information for selection operation displayed on a screen; and setting sequence execution processing of determining a signal transmission path to the switching power supply device via the signal transmission unit, setting the information for specification setting as the control parameter to the switching power supply device, and verifying the control parameter thus set, based on the information for specification setting, wherein the control parameter includes at least one of a load specification parameter based on the direct current and a source specification parameter based on the alternating voltage, and further a protection specification parameter to protect the load.

\* \* \* \* \*